United States Patent [19]

Wright

[11] 4,127,279
[45] Nov. 28, 1978

[54] TOOL HOLDER

[75] Inventor: Wyman J. Wright, Frankenmuth, Mich.

[73] Assignee: Houdaille Industries, Inc., Buffalo, N.Y.

[21] Appl. No.: 683,667

[22] Filed: May 6, 1976

[51] Int. Cl.² .................... B23B 51/06; B23C 5/28
[52] U.S. Cl. ....................... 279/1 TS; 90/11 A; 279/1 S; 279/20; 408/59
[58] Field of Search ............... 408/59, 60, 238, 239, 408/239 A; 279/1 A, 1 B, 1 S, 1 TS, 20, 102, 103; 90/11 A; 137/534

[56] References Cited

U.S. PATENT DOCUMENTS

| Re. 26,623 | 7/1969 | Erikson | 90/11 A |
|---|---|---|---|
| 1,498,477 | 6/1924 | Nichles | 137/539 X |
| 3,159,081 | 12/1964 | Erikson | 408/239 X |
| 3,583,280 | 6/1971 | Hart | 90/11 A |
| 3,905,609 | 9/1975 | Sussman | 279/20 |

FOREIGN PATENT DOCUMENTS 468,562  11/1928  Fed. Rep. of Germany ............. 279/20

Primary Examiner—Othell M. Simpson
Assistant Examiner—Abercrombie
Attorney, Agent, or Firm—Hill, Gross, Simpson, Van Santen, Steadman, Chiara & Simpson

[57] ABSTRACT

A tool holder includes a shank that has an axial passage therethrough for conducting coolant. The end of the shank remote from the cutting tool has a hollow stop screw which determines the effective length of the tool holder and which contains a check valve assembly, thus enabling the tool holder to be used in machine tools that rely upon the build-up of an air pressure as a consequence of insertion of the tool as one of its control functions.

2 Claims, 2 Drawing Figures

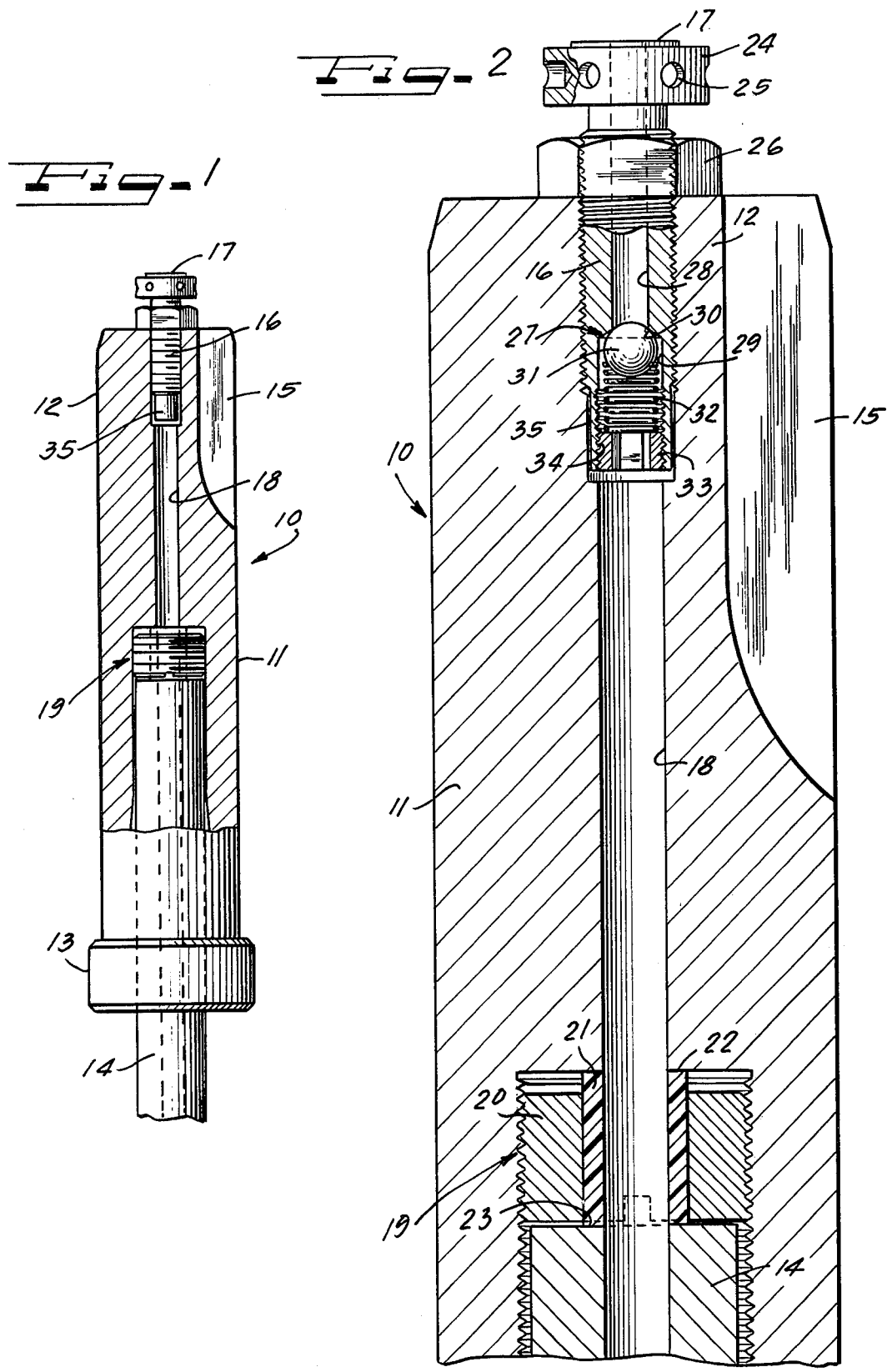

TOOL HOLDER

BACKGROUND OF THE INVENTION

1. Field of the Invention

This invention relates to a tool holder of the type that is adapted to conduct a pressurized liquid coolant therethrough.

2. Prior Art

Tool holders have been used heretofore which have a straight shank that is received in a machine tool, the presence of which blocks the flow of control air to signal the presence of a tool as part of an automatic control circuit.

Further, it has been known heretofore to provide a stop screw on the inner end of the shank of a tool for engaging a surface, such as within a machine tool spindle, such stop screw thus determining the effective length of the tool holder with its tool.

It has been known heretofore to provide a passage through such stop screw and such shank in order to enable the conduction of pressurized liquid coolant to a tool carried by the holder, the tool being adapted to receive such coolant through its shank.

If the coolant-through feature is to be combined with the air-sensing feature, the air pressure could fail to build up and thus cause the control system to malfunction. Accordingly, heretofore, tool holder shanks have been internally machined to accommodate the various parts that make up a check valve assembly, such special components lying between the stop screw and the inner end of the tool. Such a solution to the problem mentioned has been expensive in that specialized internal machining is required for the shank of the tool holder before such check valve components could be assembled therewith, thus increasing the cost of the shank portion of the tool holder.

For the manufacturer of both types of tooling, this circumstance has necessitated the stocking of both types of shank because it is too expensive to provide unneeded machining in shanks that do not need a check valve and therefore both standard and special shanks have been required to meet the demands of whatever the customer requirement might be.

Further, this solution to the problem has resulted in the necessity for providing a substantially increased number of component parts to make up the tool holder assembly.

Further, it has not been possible to utilize the standard tool holder having coolant-through capacity in an application requiring the internal check valve.

SUMMARY OF THE INVENTION

According to the invention, a tool holder is provided which has a shank with a coolant-through passage carrying at one end an externally projecting stop screw which is axially hollow. A check valve is built into the stop screw, thus obviating the need for a specially internally machined shank. By this arrangement, one shank can be used for coolant-through either with or without air sensing. Further, the problems encountered in placing the check valve in such screw and obtaining adequate flow capacity have also been overcome. Further, there has been a reduction in the number of components needed to effect the foregoing.

Accordingly, it is an object of the present invention to provide a tool holder having coolant-through capacity coupled with the capability of using the same in a machine spindle that has an air sensing device responsive to a pressure build-up when the tool is in place for actuating the collet clamping device which retains the tool holder in the spindle.

A further object of the present invention is to provide a tool holder of the coolant-through type with a check valve built into an externally projecting stop screw.

Yet another object of the present invention is to simplify the construction and reduce the number of parts while increasing the number of applications that a particular tool holder body can be used in.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

FIG. 1 is a cross-sectional view of a tool holder embodying the present invention; and FIG. 2 is an enlarged cross-sectional view of the upper portion of the tool holder of FIG. 1, showing structure provided in accordance with the present invention.

AS SHOWN ON THE DRAWING

The principles of the present invention are particularly useful when embodied in a tool holder such as shown in FIG. 1, generally indicated by the numeral 10. The tool holder 10 includes a shank 11 shown in this embodiment to be of circular cross-section and hence cylindrical. The shank 11 has one end 12 adapted to be received in a machine tool, not shown, and another end 13 adapted to support and clamp onto a tool 14 having a passage therethrough whereby the tool 14 is of the coolant-through type. The end 12 of the shank 11 has a keyway 15 by which the machine tool positively imparts rotation to the tool holder 10 and has a stop screw 16, the outermost end 17 of which comprises a stop face disposed outside of the shank 11 for engaging an abutment within the machine tool, thus determining the effective length of the tool holder 10 and the amount that the tool will project from the reference surface engaged by the stop face 17. The shank 11 has an axial passage 18 that extends through the entire length of such shank, the passage 18 being enlarged as generally indicated at 19 to form a shoulder which encircles the coolant passage 18 downstream of the stop screw 16, the shoulder facing in the direction of coolant flow, namely toward the tool 14.

Beginning at the shoulder area 19, the bore of the shank 11 is enlarged and is threaded and as better seen in FIG. 2, includes an annular bushing 20 having external threads mating with the threads within the shank 11. Within the annular bushing, there is a tubular bushing 21 made of sealing material and which is disposed within the annular bushing 19 in endwise sealing engagement with the shank 11 at 22 and with the tool 14 at 23. The tubular bushing 21 thus minimizes or eliminates any significant leakage of coolant to the outside of the tool 14.

As best shown in FIG. 2, the stop screw 16 is axially hollow and has external threads which engage with internal threads of the coolant passage at the shank end 12. The stop face 17 of the screw is carried on an enlarged head 24 which is radially apertured as at 25 to facilitate adjustment thereof, and to facilitate the holding thereof during tightening of a jam nut 26 after the stop screw 16 has been properly positioned.

The stop screw 16 carries within it a check valve assembly generally indicated at 27, and to the end, a bore 28 of the stop screw 16 is enlarged at 29 to provide a shoulder 30 formed as a valve seat which faces in the direction of coolant flow, namely downstream. A valve 31 in the form of a ball has a fluid-tight fit with the seat 30 and normally engages the seat 30, being influenced thereagainst by a compression spring 32 which normally urges the valve 27 closed with a force that is a principal factor in determining the cracking pressure of the valve 27. Further, an axially hollow nut 33 having a hexagonal internal configuration is received in a further set of threads 34 carried in an extension 35 of the stop screw. The extension 35 is not externally threaded while the shank 11 has in the bore 18 sufficient axial clearance between the end of the thread in the shank and the narrowest portion of the coolant passage 18 to accommodate such extension 35. To minimize the likelihood of possible interference therebetween, the hollow nut 33 preferably is inserted so that it is flush with the end of the hollow stop screw 16.

The spring parameters are so chosen that the valve will remain closed in response to an air pressure tending to unseat the check valve on the order of 50 psi. Thus when the tool holder is inserted in a machine tool having the air sensing device described, the air pressure is not leaked through the coolant passage 18, and the sensing pressure does not crack the relief valve. Thus normal air sensing built into the machine tool spindle will function and will effect collet clamping without interference by the disclosed tool holder. Yet when pressurized coolant is applied, it typically is available in the pressure range between 200 and 250 psi, which readily unseats the check valve 27 to provide the flow of coolant desired. In the event that the spring 32 should become relaxed by taking a set in a compressive direction, there is some adjustment range available for increasing the preload on the spring 32 by further tightening of the axially hollow nut 33. During normal manufacture, the actual cracking pressure can be permitted to fall within the range which will result from use of commercially available springs 32 with the nut 33 disposed as shown.

With the disclosed and claimed invention, it is unnecessary to provide any special machining of the shank 11 to accommodate the special stop screw 16 that contains the check valve 27. Further it is unnecessary to provide any machining in the area between the female threads for the stop screw 26 and the tool 14, such having been the practice heretofore to accommodate half a dozen parts in that region for checking against air flow. An existing conventional shank of the flow-through type can thus be utilized for both the air sensing and non-air-sensing applications with attendant savings in expenditures for tooling and the quantity of tools needed to be stocked to meet both types of usage.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A tool holder comprising in combination:
   (a) a shank adapted at one end to be secured to a machine tool and at the other end to support a tool;
   (b) means defining a coolant passage extending entirely through said shank between said ends;
   (c) an axially hollow stop screw adjustably threaded into said passage at said one end, and having a stop face outside of said shank for determining the effective length of the tool holder;
   (d) a shoulder in said shank encircling said coolant passage downstream of said stop screw and facing in the direction of coolant flow, said shoulder being defined by a threaded bore in said shank of larger diameter than said coolant passage, an annular bushing having external threads mating with said threaded bore, and a tubular bushing comprising sealing material carried within said annular bushing for endwise sealing engagement between said shank and a tool having a coolant bore therein; and
   (e) a normally closed check valve disposed within said externally projecting stop screw for conducting coolant therethrough to the tool when the same is pressurized above the cracking pressure of said check valve.

2. A tool holder comprising in combination:
   (a) a shank adapted to one end to be secured to a machine tool and at the other end to support a tool;
   (b) means defining a coolant passage extending entirely through said shank between said ends;
   (c) an axially hollow stop screw adjustably threaded into said passage at said one end, and having a stop face outside of said shank for determining the effective length of the tool holder; and
   (d) a normally closed check valve disposed within said externally projecting stop screw for conducting coolant therethrough to the tool when the same is pressurized above the cracking pressure of said check valve, said check valve comprising
      (1) a valve seat formed within said hollow stop screw, and facing in the direction of coolant flow,
      (2) a valve normally engaging said seat,
      (3) a spring normally urging said valve against said seat with a force to establish said cracking pressure,
      (4) an axially hollow nut threaded into said hollow stop screw downstream of said seat, said valve, and said spring, and providing a preload on said spring to establish said force, and
      (5) said stop screw having external threads which terminate in spaced relation to the inner end of the screw to define a cylindrical extension of the stop screw devoid of any external threads within which cylindrical extension the internal threads are disposed which mate with said axially hollow nut.

* * * * *